United States Patent [19]

Koskinen et al.

[11] Patent Number: 5,476,824
[45] Date of Patent: Dec. 19, 1995

[54] PROCESS FOR PREPARING POLYMERIZATION CATALYST CARRIER BY SPRAY CRYSTALLIZATION IN AN ELECTRIC FIELD

[75] Inventors: Jukka Koskinen, Espoo; Petri Jokinen, Porvoo, both of Finland

[73] Assignee: Neste Oy, Porvoo, Finland

[21] Appl. No.: 150,821

[22] PCT Filed: Mar. 23, 1993

[86] PCT No.: PCT/FI93/00116

§ 371 Date: Nov. 18, 1993

§ 102(e) Date: Nov. 18, 1993

[87] PCT Pub. No.: WO/9319100

PCT Pub. Date: Sep. 30, 1993

[30] Foreign Application Priority Data

Mar. 24, 1992 [FI] Finland .................... 921269

[51] Int. Cl.$^6$ ................................. B01J 31/00
[52] U.S. Cl. ............................ 502/115; 502/156
[58] Field of Search .................... 502/115, 156

[56] References Cited

FOREIGN PATENT DOCUMENTS

| 0503713 | 6/1992 | European Pat. Off. . |
| 87-07620 | 12/1987 | WIPO . |

OTHER PUBLICATIONS

Finnish Patent Application No. 870640, filed Feb. 16, 1987, cited in Official Action dated 24 Nov. 1994 in priority application.

Research Disclosure, Jun. 1982, abst. No. 21828, pp. 203–203, A. R. Blythe et al.: "Electrostatic spraying".

*Primary Examiner*—Asok Pal
*Attorney, Agent, or Firm*—Birch, Stewart, Kolasch & Birch

[57] ABSTRACT

The present invention is directed to a method for preparing particulate carriers for olefin polymerization procatalysts in which:

(a) a heated melt of a complex compound is provided having the formula I $$MgCl_2.nROH.mED \qquad (I)$$

in which ROH is a lower ($C_{1-6}$) aliphatic alcohol, ED is an electron donor, n is 1 to 6 and m is 0 to 1, (b) the heated melt is fed to a nozzle atomizing it, (c) the melt to be atomized is sprayed from the nozzle into a chamber, where it is distributed in the form of an atomized melt and then solidified to from fine carrier particles and (d) the fine carrier particles are recovered.

During this process an electric charge is fed into the melt to be atomized or which has been atomized, which decreases the surface tension of the solidified melt and prevents the agglomeration of the formed droplets. The charge can be achieved by arranging in connection with the nozzle an electrode, which together with, for example, the grounded melt, forms a static electric couple.

PROCESS FOR PREPARING POLYMERIZATION CATALYST CARRIER BY SPRAY CRYSTALLIZATION IN AN ELECTRIC FIELD

BACKGROUND OF THE INVENTION

1. Field of the Invention

The present invention relates to a method for preparing a particulate carrier for an olefin polymerization procatalyst which comprises a transition metal compound reacted with the carrier, in which method:

(a) providing a heated melt of a complex compound having formula I $$MgCl_2 \cdot nROH \cdot mED \qquad (I)$$

in which ROH is a lower ($C_{1-6}$) aliphatic alcohol, ED is an electron donor, n is 1 to 6, and m is 0 to 1, (b) feeding the heated melt to an atomizing nozzle, (c) spraying the melt to be atomized from the nozzle into a chamber at a lower temperature than the melt, thereby distributing it in the form of atomized melt, and then solidifying to fine carrier particles and (d) recovering the fine carrier particles.

2. Description of the Related Art

For the polymerization of olefins, the Ziegler-Natta catalyst system is commonly used, which consists of a so-called procatalyst and a cocatalyst. The procatalyst is based on a compound of a transition metal belonging to any of the groups IVA–VIII (Hubbard) of the Periodic Table of the elements. The cocatalyst is based on an organometallic compound of a metal belonging to any of the groups IA–IIIA (Hubbard) of the Periodic Table of the elements.

Currently, the procatalysts typically comprise an inert carrier, on which the actual active catalyst component, that is, the transition metal compound or the mixture or complex formed by catalytic compounds, is layered. The morphology, size and size distribution of the particles of the carrier influence significantly the properties of the polymer achieved by the catalyst. In fact, by an active catalyst a polymer can be produced, from which, thanks to its purity, no catalyst residues need to be removed.

The morphology and particle size of the carrier, on the other hand, affects the morphology of the polymer product itself, since it has been observed that the morphology of the catalyst is repeated in the structure of the polymer (the so-called replica phenomenon). If a flowable polymer product is desired, having a useful morphology and a narrow particle size distribution, which is desirable in view of the use of the polymer in subsequent many processes, the properties of the carrier shall, because of the replica phenomenon, be made similar to the desired polymer properties.

Currently, procatalysts of the Ziegler-Natta type typically comprise a magnesium-based carrier, such as a magnesium chloride, treated with a transition metal compound, such as a titanium halide, more particularly titanium tetrachloride, and sometimes also with an electron donor compound. It is also known that the carrier can be used in a preferred and equal-sized crystal form by allowing it to crystallize as a complex of any of its crystal solvents.

The patent family consisting of, among others, EP specification 65700 and U.S. Pat. No. 4,421,674 and which claims priority from the Italian application IT 2,188,181 (810521) relates to a method for preparing a catalyst which is particularly active in the polymerization of gaseous ethylene.

In this process, a titanium halide is reacted with a magnesium chloride catalyst carrier, in the form of microspheres, after which the reaction product particles are recovered by physical means and mixed with an organometallic cocatalyst compound.

These conventional methods generally require:

(a) a solution essentially containing magnesium dichloride dissolved in ethanol, in an amount of 100 to 300 g of magnesium dichloride/l of solution, whereby the water-content of the solution does not exceed 5% by weight;

(b) spray-drying of this solution by spraying it into an essentially non-aqueous flow of nitrogen gas, the purity of which is at least 99.9% and the inlet temperature of which flow is between 180° and 280° C., whereby the nitrogen and the solution flows are simultaneously controlled so that the outlet temperature of the gaseous mixture is between 130° and 210° C., provided that the outlet temperature is at least 40° C. lower than the inlet temperature and that the ethanol does not evaporate completely, whereby spheroidal magnesium dichloride particles are obtained;

(c) reacting the magnesium dichloride particles with a titanium halide, which is in vapor or liquid form and optionally diluted with an inert solvent to be evaporated;

(d) recovering the reaction product particles by physical means when they contain 0.7 to 12% by weight of titanium bound to the solid material; and (e) mixing these reaction product particles with an organometallic compound, which is an alkylaluminum or an alkylaluminum halide.

This type of spray-drying method is based on a fairly complete drying of ethanol ($C_2H_5OH$) from the carrier liquid after atomization. The carrier has commonly been dried at a temperature that is above 150° C. whereby a remarkable portion of the alcohol of the complex is evaporated. Typically, the alcohol concentration of the carrier product obtained by the spray drying method is between 12 and 25% by weight, and in any case is below 30% by weight.

One drawback of the conventional spray-drying method is that when the alcohol forms on the surface of the magnesium dihalide, a site reacting with the transition metal compound, the low alcohol content of the carrier results in a weak activation with the transition metal compound, such as titanium halide. A further essential drawback of the spray-drying is the poor morphology and the broad particle size distribution of the carrier obtained, which is caused by the breaking and collapsing of the particles during the process.

According to Finland patent specification 80055 (Neste Oy) the above mentioned carrier complex formed by the carrier and the crystal solvent can be melted to form clear liquid. When this liquid melt is conducted through a spray nozzle into a spraying chamber cooled by cold nitrogen gas, it crystallizes into spheroidal small carrier particles, which are very fluid and loose. In practice, $MgCl_2$ and $C_2H_5OH$ are melted at a temperature of 110° to 130° C. to form a clear melt. This clear, homogenized mixture is fed through an atomizing nozzle into a cooled spraying chamber. The atomizing gas used in the spraying is dry nitrogen, the temperature of which is about +130° C., and the spraying chamber is cooled by conducting in dry nitrogen, the temperature of which is on the order of about −20° C. The nozzle used is a gas-liquid-fluidizing nozzle or the like. Improvements to this so-called spray-crystallization method have been presented, among others, in Finland patent applications 912639 and 915632.

Figure 1A:
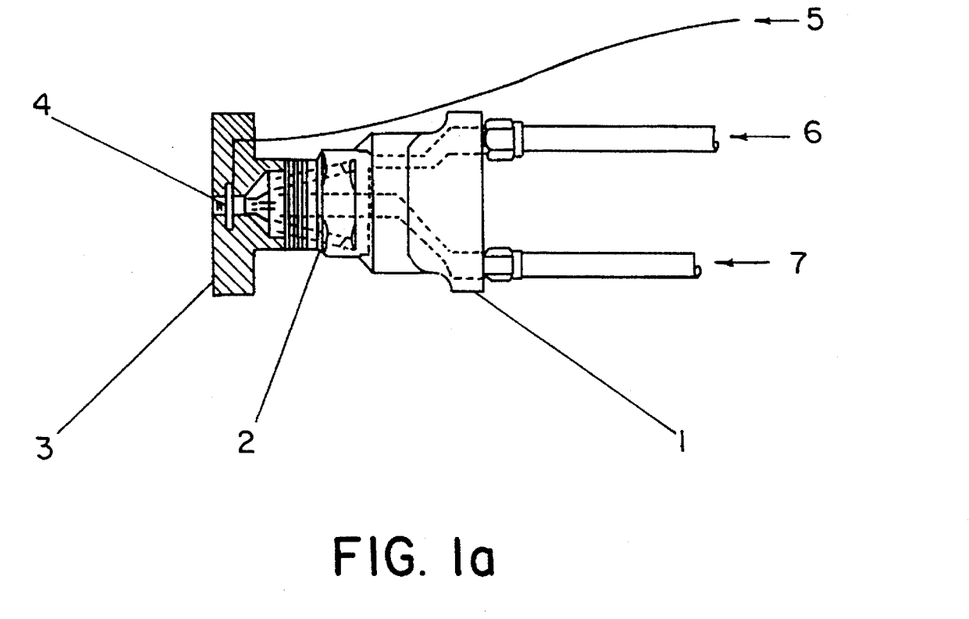
Figure 1B:
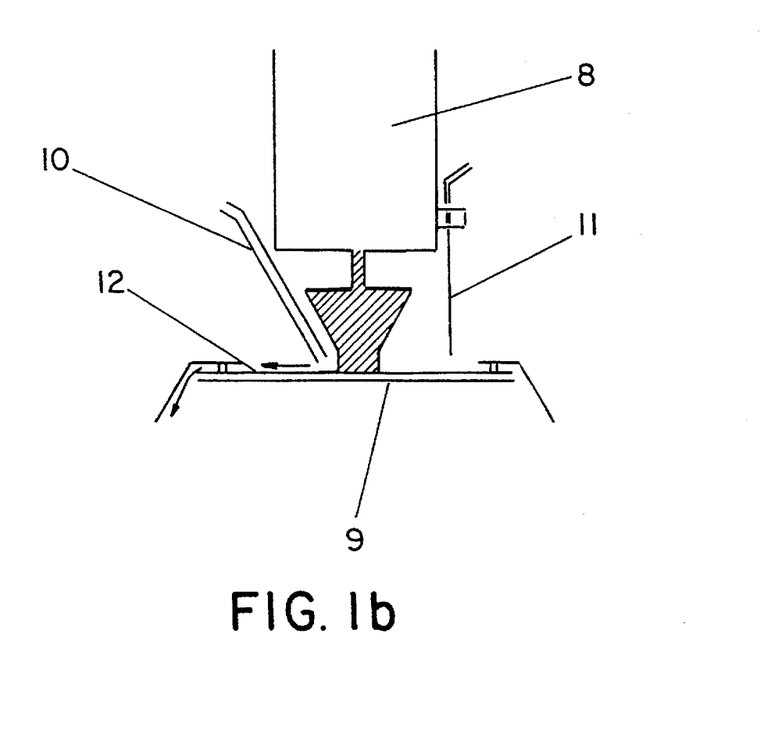
Figure 2:
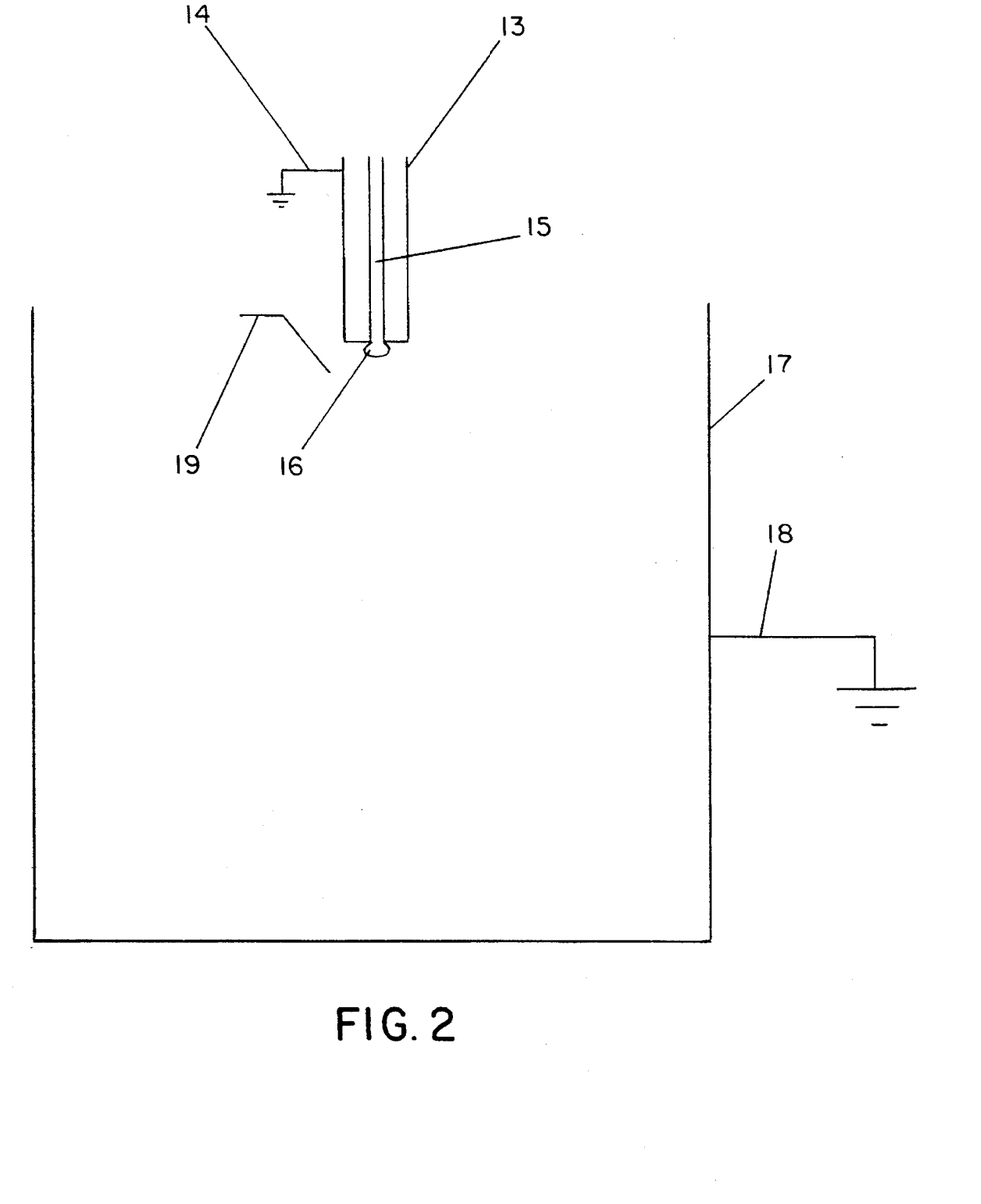
Figure 3:
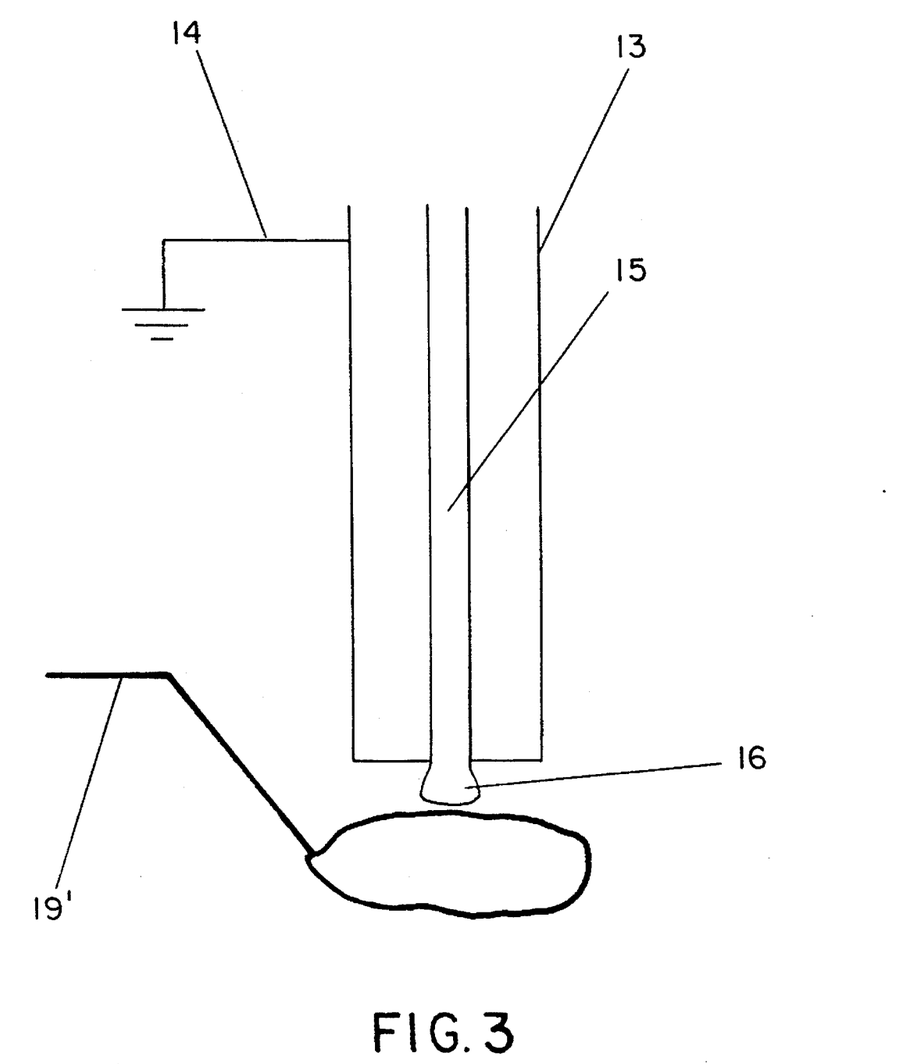
Figure 4:
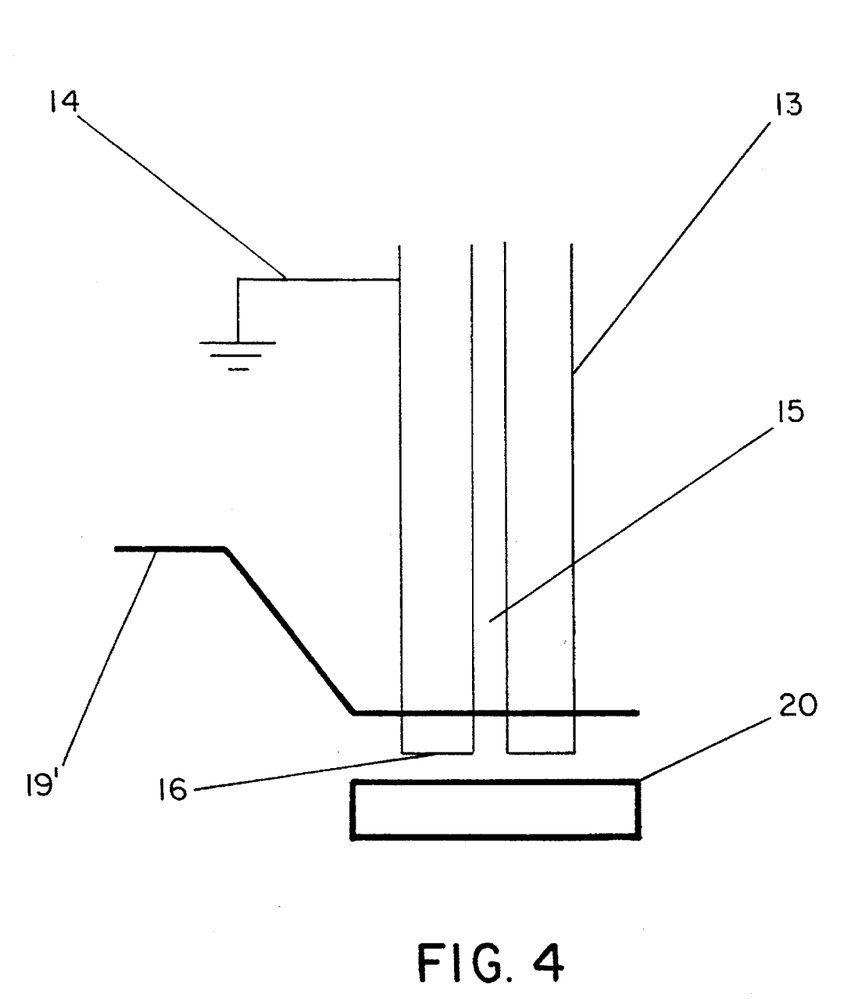
Figure 5:
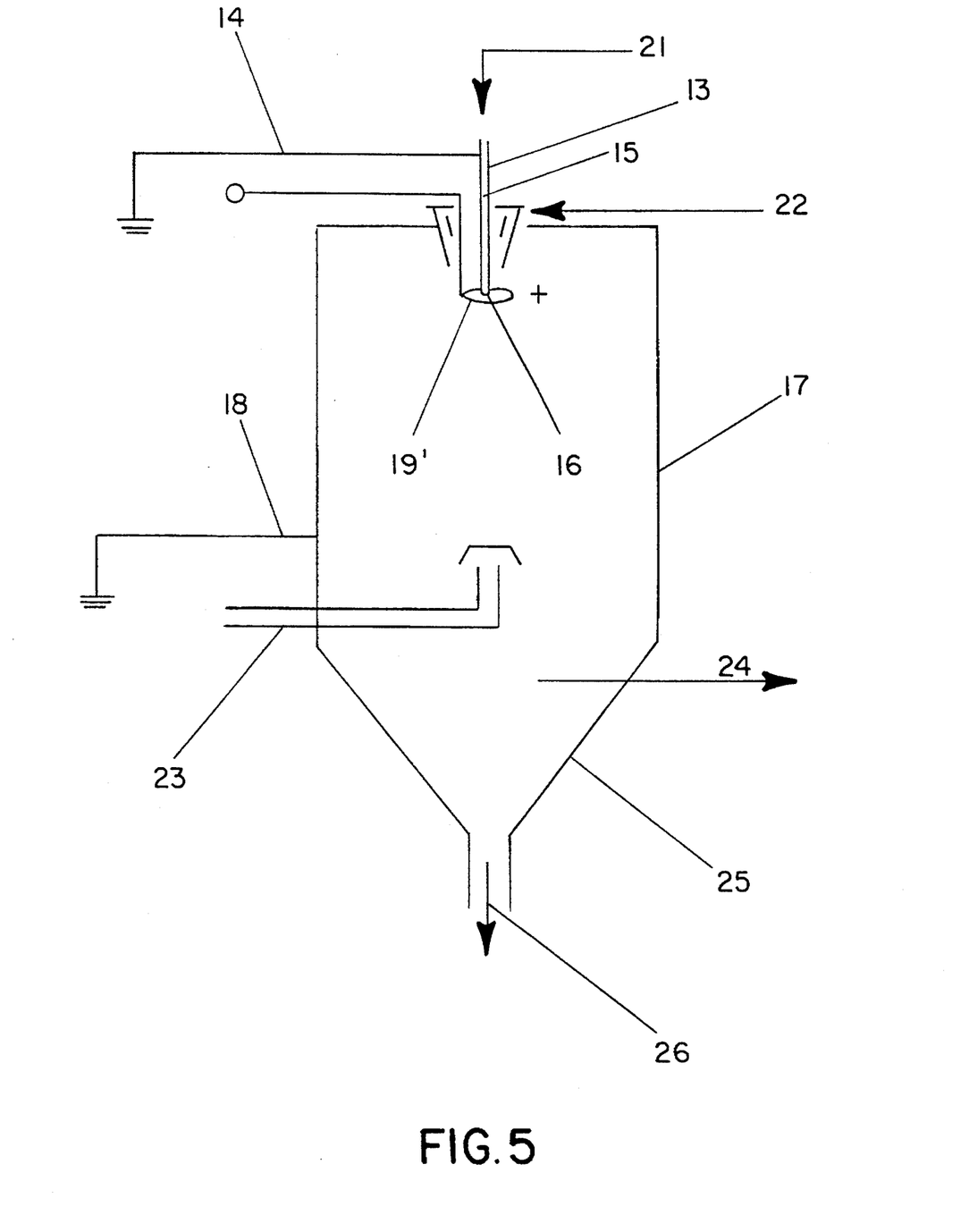

The spray-crystallization method produces very flowable and loose particles. Furthermore, the carrier complex crystallizes without substantial evaporation of the crystallization solvent. The amount of the evaporating crystallization solvent is below 3% by weight of the amount fed into the chamber. When this kind of carrier is brought into contact with the titanium compounds, an abundance of catalytically active complexes between $MgCl_2$, and the titanium compound are formed on the surface of the carrier when the crystal solvent evaporates. A drawback of this kind of a method is, however, than an insufficient amount of fine particles or particles of equal size are formed. This may be due to the high viscosity and surface tension and/or the agglomeration of the droplets in the atomizing chamber.

RD (Research Disclosure) 218028-A discloses a method in which an electrostatic spraying is carried out in a closed system using at least one high voltage electrode to keep the droplets away from the walls of the atomizing chamber. Grounded needles are placed around the nozzles to discharge the charge of the droplets. A gas flow is also arranged around the nozzle to keep the droplets in the middle zone of the chamber.

The liquid to be sprayed is a solution or suspension that can be spray-dried to solid particles. Typical solutions according to the publication are water or alcohol solutions of magnesium chloride. Typical suspensions are hydrocarbon suspensions of titanium dichloride, on hydrocarbon suspensions of titanium tetrachloride on magnesium chloride particles. Additives can be added to the liquid to improve its conductivity.

This kind of an electrostatic spray-drying technique produces solid titanium dichloride particles, or magnesium chloride particles carrying titanium tetrachloride, having a narrow particle size distribution and being especially suitable for gas phase polymerization.

The above-mentioned electrostatic spray-drying has, however, drawbacks of its own. As is well known, the initial droplets of the spray-drying are small in size and light in weight. In the spray-drying chamber a rapid heating of the droplets and simultaneously a rapid evaporation upwards and outwards takes place, which draws the initial droplets into an uncontrolled turbulent motion, which results in both the agglomeration of the droplets and their attachment to the walls of the chamber.

Accordingly, the electrostatic spray-drying of the Research Disclosure does not relate to any actual improvement of the droplet formation; its main purpose is to prevent the sticking of the formed particles to the process equipment. As stated above, the spray-dried particles intend to break and collapse, so that the electric potential which decreases the surface tension sooner tends to contribute to the breaking and collapsing of the particles, rather than to the forming of morphologically useful particles.

Moreover, large amounts of solvent or suspension liquid evaporates into the chamber space during the spray-drying, which may lead to a discharge of the electrical charge, which can result in a lowering of the atomizing effect and in an electrical breakdown causing an extra risk of explosion.

SUMMARY OF THE INVENTION

An object of the present invention is to provide a method for the preparation of a particulate carrier for an olefin polymerization catalyst, which method produces a carrier with a suitable and homogeneous size, and a suitable morphology. More specifically, it is an object of the present invention to obtain an optimal atomizing technique for a liquid containing the carrier, in which the distribution of the droplets in a fog of controlled size is possible. Thus, it is an object of the invention to provide a method which produces small particles and particles of homogeneous size, while preventing simultaneously the agglomeration of particles until the particles solidify to final carrier particles. One further object of the invention is to provide a secure and reliable method for preparing useful carrier particles of the type mentioned.

These and other objects and advantages of the invention have been achieved by providing a new method for preparing an olefin polymerization catalyst carrier, which method comprises:

(a) providing a heated melt of a complex compound having formula I $$MgCl_2.NROH.mED \quad (I)$$

wherein ROH is a lower aliphatic alcohol having 1 to 6 carbon atoms, ED is an electron donor, n is 1 to 6, and m is 0 to 1;

(b) feeding the heated melt into an atomizing nozzle having at least one orifice;

(c) spraying the heated melt from the atomizing nozzle into a chamber colder than the melt, distributing the heated melt in the form of an atomized melt, and cooling and solidifying the atomized malt to fine carrier particles; and (d) recovering the fine carrier particles; wherein an electrical charge is applied to the heated or heated and atomized melt by an electrode arranged in connection with the atomizing nozzle, the voltage of which electrode is about 0.5 to 10 kV.

It has thus been realized that when melt of the carrier complex is fed from the nozzle into the chamber, wherein it becomes atomized and solidifies, an electrical charge is simultaneously fed into the melt to be atomized or which has been atomized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein:

FIGS. 1A and 1B depict two types of nozzles suitable for carrying out the invention;

FIG. 2 depicts schematically equipment intended for carrying out the invention;

FIG. 3 depicts an electrostatic nozzle of one type used in the invention;

FIG. 4 depicts an electrostatic revolving-plate nozzle suitable for the invention;

FIG. 5 depicts the equipment used in the invention.

DETAILED DESCRIPTION OF THE INVENTION

By supplying a large enough electrical charge into the melt to be atomized, electrostatic forces grow so strong that they oppose surface tension forces and cause a readier drop formation of the melt. By this technique, the carrier melt can be divided into remarkably finer drops than by using normal centrifugal or gravitational force. In addition, in the method according to the present invention, the agglomeration of droplets is prevented, so that they do not attach to each other. Thus, the agglomeration of the particles and their intermediate forms can be prevented by feeding an electrical charge into the melt to be atomized or which has been atomized. Because they retain the charge after atomization, the particles remain, due to the Coulomb forces, detached from each other. They become charged and retain their charge according to their physical properties (resistivity, permeability) for a certain time, during which the electrostatic forces influence their route.

The achievable charge on the particle is in practice no more than a half of the so-called Rayleigh limit value, i.e.

$$q = 4\pi \sqrt{\frac{\epsilon_0 T d^3}{8}} \quad (II)$$

in which
q=the charge of the particle
T=the surface tension
d=the diameter of the particle
$\epsilon_0$=the absolute permeability These charged particles form around themselves an electric field which tends to keep particles of similar charge apart from each other. The charge required for repelling particles is decidedly dependent on the atomizing construction used, i.e., size and rate distribution of the particles and the distribution of the charge within them influence the final result.

One condition for the success of an electrostatic spray-crystallization method is that the electrical conductivity of the carrier melt must be within a suitable range, so that it is possible to supply a charge of the size needed into the melt. Moreover, the permeability of the carrier melt must be within a suitable range when the temperature of the melt is decreasing and the melt is crystallizing, allowing the melt particles to be sufficiently charged. The charge fed to the melt must not cause any electrical breakdown or any extra risk of explosion during discharge, as is the case with spray-drying, where the evaporating solvent and the medium cause such risks.

In its broadest sense the method according to the present invention is a so-called spray-crystallization method, which has been modified by feeding an electrical charge into the melt to be atomized or which has been atomized. By the term "spray-crystallization method" is meant a method in which the melt of the carrier complex is sprayed from a nozzle into a chamber, where it is distributed as an atomized melt and solidifies to form fine carrier particles. Spray-crystallization differs from spray-drying in that the material to be sprayed is a melt of $MgCl_2 \cdot nEtOH$, and not a solution. When the temperature of a solution decreases, material crystallizes from it having a chemical composition, i.e. an element or molecular ratio, which is essentially different from that of the solution. In the case of a solution, the complex $MgCl_2 \cdot nEtOH$ cannot crystallize to form the necessary structures (i.e., a crystal lattice, in which n is greater than 6). In the present invention n is smaller than 6, whereby a complex is in question, which is melted and crystallized without evaporation of larger EtOH amounts.

An electrical charge is consequently fed to the melt to be atomized, or which has been atomized. The voltage is preferably of the order of about 0.5 to 10 kV, preferably about 1 to 5 kV.

According to one preferred embodiment a charge is fed into the melt to be atomized, or which has been atomized, by an electrode arranged in connection with the nozzle. A suitable electrode used thereby is a current-bearing conductor, which is a straight or annular electric line arranged in the immediate vicinity of the nozzle orifice, preferably at a distance of about 5-10 mm from it. A charge is thereby created in the electrode by applying a voltage of the order mentioned, and preferably grounding the melt, for example, by grounding the conductive mouth piece of the nozzle. Also, the chamber wall can preferably be grounded to further decrease explosion hazard.

An electrostatic nozzle operates so that an electrostatic charge is formed on the surface of the particles formed during atomization. The electrostatic charge is a force counter to the surface tension forces, due to which the external energy needed for drop formation decreases. By using mechanical drop formation energy in the atomization of the electrically charged melt, drop formation becomes easier, and the size and size distribution decreases. (i.e., the drops become smaller and more monodisperse) The electric field strength needed to counter the surface tension forces is $10^3$–$10^6$ V/m, depending on the consistency of the melt. By an electrostatic spraying atomization, a homogeneous fog is achieved, the particle size and distribution of which can be controlled.

As electrostatic nozzles, conventional nozzle types, as discussed above, or a special nozzle designed for this purpose, can be used. Particularly, a so-called linear slot die can be used, in which the atomization takes place through a long slot. Typically, the capacity of this kind of a nozzle is insignificant, but it can be increased by adding a number of the nozzles. A long slot die can also be joined from its ends, forming an annular nozzle. In this case, the capacity of the nozzles can be increased by using several annular nozzles inside each other.

According to one preferred embodiment of the invention, the melt to be atomized during stage (c) is sprayed into the chamber by means of a nozzle, which consists of a fixed orifice, a melt pipe leading to the orifice, a pressure inert gas pipe leading to the orifice and a high voltage line arranged in the vicinity of the orifice.

According to another preferred embodiment, the melt to be atomized is sprayed during stage (c) by means of a revolving nozzle in connection with which a high voltage line of the type mentioned above has been arranged. Although straight or annular electric lines have been discussed above, it is clear that the invention relates to all kinds and shapes of lines and electrodes, wherein the above-mentioned electrical charge is created in the electrode.

When, a complex compound is prepared during step (a) to be used in the method according to the invention, it is preferable to select a complex in which the ROH according to the formula (I) is $C_2H_5OH$ and/or $CH_3OH$, preferably $C_2H_5OH$. Preferably, n according in formula (I) is about 2.0–5.0, and most preferably about 3.0–4.0.

The complex is then melted and fed into a nozzle atomizing it during step (b), whereby the temperature of the melt preferably is about +80° to +250° C. and most preferably about +90° to +130° C. The nozzle can be any kind of suitable atomizing nozzle, such as a pneumatic nozzle, an air jet, a revolving nozzle, or an ultrasonic nozzle. According to one preferred embodiment, a pneumatic nozzle or an air jet is used, which is a linear or a round slot die. According to another preferred embodiment, a revolving nozzle is used, which is a pipe processed in the form of a cicle (ring), into which round slots having the diameter of 0.5–1.0 mm have been bored at suitable distances.

Usually, the atomized melt is fed into the upper part of an essentially vertical chamber, the temperature of which is between −10° and +50° C. According to another embodiment, different temperatures are maintained in the upper and lower parts of the chamber. Thereby, the temperature of the atomizing zone in the upper part of the chamber is preferably maintained between about +10° and +100° C., preferably between about +20° and +40° C., and the crystallizing zone in the lower part of the chamber is maintained at a lower temperature, preferably about −30° and +40° C. and preferably at a temperature of about +20° and +40° C.

The melt to be atomized can suitably be sprayed from a nozzle into the chamber by means of a nitrogen flow, which circulates downward in the chamber in order to achieve an advantageous flow pattern. The temperatures of the atomizing and crystallizing zones of the chamber can, if desired, be maintained by means of one or several inert gas flows, whereby the gas flow of the atomizing zone can simultaneously be the atomizing gas conducted into the nozzle or its vicinity and the gas of the crystallizing zone can be conducted into the chamber, either into the crystallizing zone or between the atomizing and crystallizing zones, by means of a pipe.

Finally, the fine carrier particles are recovered during step (d), preferably from a funnel in the lower part of the vertical chamber.

The recovered fine carrier particles are then reacted with the transition metal compound, preferably $TiCl_4$, and optionally with an electron donor, to prepare an olefin polymerization procatalyst. The olefin polymerization procatalyst is then used together with an organoaluminum-type cocatalyst for the polymerization of olefins.

The electrified airblast nozzle (Law) of the schematic diagram depicted by FIG. 1A consists of a nozzle body 1, a liquid dome 2, an air dome 3, an electrode 4 embedded in the air dome 3, and a high voltage feed 5 leading to the nozzle 1-4, a pressure gas feed 6 and a liquid feed 7.

The nozzle operates so that fed melt carrier complex is fed to the pipe 7 simultaneously as pressurized nitrogen or some other pure, inert gas is fed into the pipe 6 and high voltage direct-current is coupled to the high voltage line 5. The pressurized nitrogen flow and the complex melt flow coincide at the nozzle orifice, in the close vicinity of which there also is the embedded electrode 4, mentioned above. The result is a fog consisting of electrically charged fine droplets.

FIG. 1B depicts a charged revolving-plate nozzle (Arnold and Pye), the main parts of which consist of a motor 8 causing the rotation, a revolving plate 9, a feed pipe 10 for the complex melt, an electrode 11 causing the electric charge, and a conductive plate 12 arranged on the revolving plate.

This device operates so that the revolving plate 9, which is, for example, a Micron Herbi standard plate having a diameter of 7.5 cm, the center of which has been removed and replaced by the conductive plate, revolves simultaneously as a voltage is coupled between the revolving plate 9 and the electrode 11. Then, complex melt is fed through pipe 10 to the revolving plate 9, where it contacts the conductive plate 12 and becomes charged. Simultaneously, the melt moves, due to the centrifugal force, towards the circumference of the revolving plate 9 and finally becomes atomized through a guide plate arranged in the chamber space in connection with the revolving plate. The manufacturers have suggested a voltage of about 30 kV to be used in this device.

In FIG. 2, equipment used in the method according to the invention has been shown. The nozzle 13 is furnished with an oil heater and grounding 14, as well as a channel 15 with openings 16 for spraying the complex melt into the chamber 17, which is also grounded 18. Near the nozzle orifice, an electrode 19 has been arranged, to which a voltage of 4 kV has been coupled.

The equipment operates so that complex melt is fed to the grounded 14 nozzle 13 and it is sprayed out through the nozzle orifice or orifices 16. Due to the electrode 19 in the vicinity of the nozzle orifice 16, the melt is charged just before it is atomized, whereby the charge facilitates the breaking of the melt into droplets and simultaneously keeps the droplets formed separate from each other. The fog droplets move downwards in the chamber 17 and solidify to solid carrier particles due to the low temperature in the chamber 17.

In FIG. 3, a slightly different electrostatic nozzle arrangement can be seen. The arrangement is otherwise the same as that presented in FIG. 2, except that a ring electrode 19' arranged in front of, and around, the nozzle orifice or orifices 16 is the electrode. This kind of ring electrode 19' is symmetrical with respect to the spraying axis of the complex melt, and it can be expected to operate better than the usual bar electrode 19 shown in FIG. 2.

In FIG. 4, a revolving plate 20 has been arranged below the nozzle orifice 16, and simultaneously the ring electrode has been raised to surround the nozzle body 13, so that it does not interfere with the revolving-plate nozzle 20. In this arrangement, the atomization promoting effects of the rotating-plate nozzle 20 and the ring electrode 19' have been combined. The success of the atomization step, that is the fine spraying step, is the most significant problem when melt material is sprayed. This problem is not as critical when more finely-flowing materials are sprayed.

FIG. 5 shows a more complete view than FIG. 2 of how the method according to the invention operates. The carrier melt 21 is fed into the nozzle 13, in the duct 15, whereby it reaches the nozzle orifice 16. Simultaneously, an inert gas is fed into the chamber through the nozzles 22 and 23, the function of which is to act as a protective and temperature controlling gas. The gas fed into the upper part 22 of the chamber is given a rotating motion, by means of which contact of the particles with the walls of the chamber is prevented or decreased.

The actual nozzle structure 13 is electrically conductive, and it is grounded 14. An electrical charge has been applied to the melt by furnishing the nozzle 13, in close vicinity of its end 16, with a ring electrode 19', the voltage of which is about 0.5–10 kV.

The melt is sprayed from the nozzle 13, through the openings 16 into the chamber 17, which is grounded 18. The melt is immediately distributed in the upper part of the chamber into an atomized melt, which due to the gravitational force and the flow pattern of the cooling gas moves to the lower part of the chamber. When the melt at the nozzle orifice is at a temperature of about +80° to +250° C., the temperature can, according to one embodiment, be maintained at between −10 to +50, so that the temperature is higher in the upper part of the chamber than in its lower part.

The inert gas, preferably nitrogen 22, fed into the chamber moves downwards in the chamber 17 with the fog, preferably along a downward spiral path, until it is removed from the lower part 24 of the chamber.

The melt fog solidifies in the lower part of the chamber to form fine carrier particle material, which is recovered in a funnel 25 in the lower part of chamber 17 and is removed 26.

The following examples are provided to illustrate the present invention and are not intended to limit the invention in any way.

EXAMPLE 1

A melt of $MgCl_2$+3.5 EtOH was fed under a pressure of 15 bars at a temperature of 125° C. into a pressure nozzle, the diameter of which was 0.6 mm, the capacity being 30 kg/h. The temperature in the spray-chamber was −10° C. under a dry nitrogen atmosphere. The nozzle and the walls of the spray-chamber were grounded in the manner shown in FIG. 2. At a distance of 10 mm from the nozzle, a needle electrode coupled to a +4 kV potential was placed. The strength of the current was 120 μA. The contamination of the electrode was prevented by nitrogen blasting. The voltage source used had an automatic protective reactance to prevent overload situations and breakdowns.

By this electrostatic spray crystallization, an even melt fog was continuously achieved, in which the particles due to their charge kept efficiently apart from each other before crystallization. The charge of the crystallized particles was discharged through the grounded walls of the chambers, and the end product was very fluid and loose. The agglomeration of the particles was very insignificant. The particle size was between 20–120 μm, S.D. 50 μm, and span 1.8 μm. The chemical consistency of the carrier particles was $MgCl_2$+3.2 EtOH.

EXAMPLE 2

The conditions were the same as in Example 1, but the electrode construction according to FIG. 3 was used. The distance of the annular electrode was 6 mm and the potential was +kV. The operation of the annular electrode construction was ideal, and the fog became charged more evenly than in the case of Example 1.

EXAMPLE 3

The melt was fed into a revolving-plate nozzle according to FIG. 4 and a ring electrode according to FIG. 5 was used, which ring had been placed 10 mm above the plate. The radius of the ring electrode was 20 mm longer than that of the revolving plate. The capacity of the melt feed was 30 kg/h and the rotative velocity was 18,000 rpm.

The tension of the electrode was +4 kV and the current was 90 μA. The agglomeration of the particles was again insignificant, and an even, loose carrier powder was obtained as the product. The size of the particles was between 20–100 μm, S.D. 40 μm and span 1.6 μm. The chemical consistency of the carrier was $MgCl_2$+3.2 EtOH.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for preparing a particulate carrier for an olefin polymerization procatalyst containing a transition metal compound reacted with a carrier, comprising:

(a) providing a heated melt of a complex compound having formula I $$MgCl_2.nROH.mED \qquad (I)$$

wherein ROH is a lower aliphatic alcohol having 1 to 6 carbon atoms, ED is an electron donor, n is 1 to 6, and m is 0 to 1;

(b) feeding the heated melt into an atomizing nozzle having at least one orifice;

(c) spraying the heated melt from the atomizing nozzle into a chamber colder than the melt, distributing the heated melt in the form of an atomized melt, and cooling and solidifying the atomized melt to fine carrier particles; and (d) recovering the fine carrier particles; wherein an electrical charge is applied to the heated or heated and atomized melt by an electrode arranged in connection with the atomizing nozzle, the voltage of which electrode is about 0.5 to 10 kV.

2. The method according to claim 1, wherein the electrode is a straight or annular electric line conductor arranged in the immediate vicinity of the nozzle orifice.

3. The method according to claim 1 wherein the charge is achieved in the electrode by applying to it a voltage of 0.5 to 10 kV and grounding the melt.

4. The method according to claim 3, wherein the wall of the chamber is also grounded.

5. The method according to claim 1 wherein said spraying step (c) comprises spraying the melt to be atomized through a nozzle comprising an orifice, a melt pipe leading into the orifice, a pressure inert gas pipe, and a high voltage line arranged in the vicinity of the orifice.

6. The method according to claim 1, wherein said spraying step (c) comprises spraying the melt to be atomized by means of a revolving nozzle, in connection with which a high voltage line has been aranged.

7. The method according to claim 1, wherein ROH of formula (I) is selected from the group consisting of $C_2H_5OH$, $CH_3OH$, and mixtures thereof.

8. The method according to claim 1, wherein n according to formula (I) is about 2.0 to 5.0.

9. The method according to claim 1 wherein the melt is fed into the atomizing nozzle at a temperature of about +80° to +250° C.

10. The method according to claim 1 wherein said atomizing nozzle is selected from the group consisting of a pneumatic nozzle, a pressurized or unpressurized hole nozzle, a revolving nozzle and an ultrasonic nozzle.

11. The method according to claim 10, wherein said pneumatic or pressurized nozzle comprises a linear or round slot die.

12. The method according to claim 1 wherein said spraying (c) comprises spraying the heated melt from the atomizing nozzle into an upper zone of an essentially vertical chamber, the temperature of which chamber is about −10° to +50° C.

13. The method according to claim 1 wherein said spraying (c) comprises spraying the heated melt from the atomizing nozzle into a spray zone in the upper part of an essentially vertical chamber, wherein the temperature in the spray zone is about −10° to +100° C.

14. The method according to claim 13, wherein said spraying (c) further comprises moving the atomized melt from the spray zone into a crystallization zone in the lower part of the chamber, where a lower temperature is maintained than in the spray zone.

15. The method according to claim 1 wherein said spraying (c) further comprises feeding nitrogen into the upper and middle part of the chamber, which nitrogen circulates downwards along a spiral path in the chamber.

16. The method according to claim 1 wherein said spraying (c) further comprises maintaining the temperatures of the atomizing and crystallizing zones by means of one or several inert gas flows.

17. The method according to claim 16, wherein said inert gas is introduced into the crystallizing zone or between the atomizing and the crystallizing zones.

18. The method according to claim 1 wherein said step (d) comprises recovering the fine carrier particles from a funnel in the lower part of the vertical chamber.

19. A method for preparing a procatalyst for polymerization or copolymerization of olefins, comprising reacting the fine carrier particles recovered from the process of claim 1 with a transition metal compound and optionally with an electron donor.

20. A method for polymerizing or copolymerizing olefins, comprising contacting said olefins with a procatalyst prepared by the method according to claim 1 together with an organoaluminum cocatalyst, and recovering the resulting polyolefins.

21. The method according to claim 2, wherein said electrode is arranged at a distance of about 5 to 10 mm from said nozzle orifice.

22. The method according to claim 3, wherein said grounding of said melt comprises grounding an electrically conductive portion of said atomizing nozzle in contact with said melt.

23. The method according to claim 7, wherein ROH is $C_2H_5OH$.

24. The method according to claim 8, wherein n is about 3.0 to 4.0.

25. The method according to claim 9, wherein said melt temperature is about 90° to 130° C.

26. The method according to claim 12, wherein said chamber temperature is about −10° to 40° C.

27. The method according to claim 13, wherein the temperature in the spray zone is about 20° to 80° C.

28. The method according to claim 14, wherein the temperature of the crystallization zone is about −30° to 40° C.

29. The method according to claim 28, wherein the temperature of the crystallization zone is about −20° to 40° C.

30. The method according to claim 19, wherein said transition metal compound is $TiCl_4$.

* * * * *